L. L. LIBBY.
TRANSMISSION BAND LINING.
APPLICATION FILED OCT. 28, 1919.
1,362,495.
Patented Dec. 14, 1920.
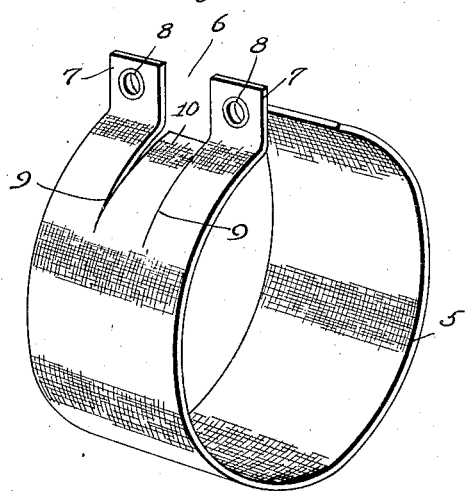
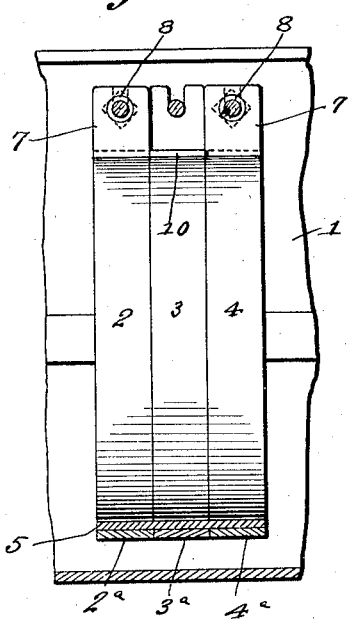
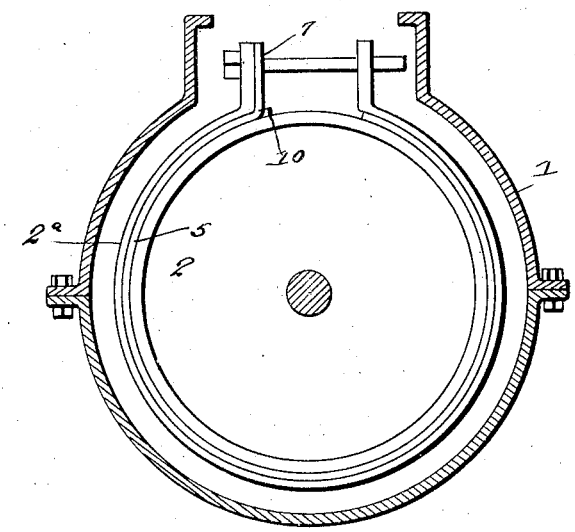
Witnesses
P. G. Thomas
Inventor
Lewis. L. Libby.
By Victor J. Evans
Attorney

UNITED STATES PATENT OFFICE.

LEWIS L. LIBBY, OF WINDSOR LOCKS, CONNECTICUT.

TRANSMISSION-BAND LINING.

1,362,495.      Specification of Letters Patent.      Patented Dec. 14, 1920.

Application filed October 28, 1919. Serial No. 333,997.

*To all whom it may concern:*

Be it known that I, LEWIS L. LIBBY, a citizen of the United States, residing at Windsor Locks, in the county of Hartford and State of Connecticut, have invented new and useful Improvements in Transmission-Band Linings, of which the following is a specification.

The object of my present sole invention is the provision of a transmission band lining designed more particularly for use in combination with the bands and the drums of a Ford transmission, and so constructed that the low speed band will be effectively prevented from cutting into and cutting off the end portions of the lining.

To the attainment of the foregoing, the invention consists in the improvement as hereinafter described and definitely claimed.

In the drawings, which are hereby made a part hereof:

Figure 1 is a perspective of the improved transmission band lining *per se*.

Fig. 2 is a fragmentary elevational view in section of the casing showing the drums therein, and the bands and lining in section.

Fig. 3 is an end view in part section showing the arrangement of the improved transmission band relatively to the parts of an automobile transmission.

Similar numerals of reference designate corresponding parts in all of the views of the drawings.

The conventional transmission illustrated comprises a casing 1, a brake drum 2, a low-speed drum 3, a reverse drum 4, and bands $2^a$, $3^a$, and $4^a$, complementary to the drums 2, 3 and 4, respectively.

The improved band lining 5 is of a width equal to the combined width of the plurality of drums 2, 3 and 4. Said lining 5 is preferably, though not necessarily, of textile material, and at one end it is bifurcated, as indicated by 6, and is thereby provided with two tabs 7 in which are eyelets 8, designed for the reception of the shafts of the speed levers.

As thus far specifically described, the lining 5 is similar to that constituting the subject of my contemporary application filed August 2, 1919, Serial No. 315,018, and my present invention consists in providing the lining 5 with the longitudinal cuts 9, whereby is formed a tongue or strip 10, one end 11 of whch is free and movable because of the flexibility of the lining with respect to the major portion of the lining. The said tongue or strip 10 serves the important purpose of preventing the low-speed band $3^a$ from cutting into the end portions 7 of the lining and thereby precludes the possibility of the said end portions 7 being cut from the remainder of the lining, which would render the lining as a whole useless.

In applying my improved lining 5, the same is slipped into working position between the peripheries of the drums 2, 3 and 4, and the inner surfaces of the transmission bands $2^a$, $3^a$ and $4^a$, and the end portions 7 of the lining are placed as stated relatively to the speed lever shafts, and so that the tongue or strip 10 will be positioned for the efficient performance of the function hereinbefore ascribed to the same.

It will be noted that the improved lining 5 may be readily applied as described, without entailing the disarrangement of the transmission bands, and without the necessity of removing the top of the transmission casing.

In the use of the lining applied as stated, the usual contraction of any one of the bands $2^a$, $3^a$ or $4^a$ will enable the lining 5 to adequately hold against turning the drum that is the complement of the contracted bands, and this without the other drums being affected, notwithstanding the interposition of the single lining 5 between the plurality of drums and the transmission bands of said drums.

Manifestly the provision of the strip or tongue 10 does not appreciably increase the cost of the lining.

Having described my invention, what I claim and desire to secure by Letters-Patent, is:

1. As a new and useful article of manufacture, a transmission band lining of a width equal to the combined widths of the drums of the transmission and equipped at one end with means for fastening it in working position and also equipped at said end with means to prevent a low speed band from cutting off said fastening means; the said lining being adapted to be slipped into position between the perimeters of the drums and their complementary bands.

2. As a new article of manufacture, a transmission band lining for interposition between the drums and the bands of a transmission; the said lining having one end bifurcated and apertured in the arms of the bifurcation and also having longitudinal slots extending from the base of the bifurcation and forming a strip or tongue, for the purpose set forth.

3. Automobile transmission mechanism involving a series of drums arranged side by side; a strap around each drum, means to individually constrict each strap around its coöperating drum, and a single band between the drums and the straps; one end of the said band being fastened and having means adjacent to said end to prevent one of the straps from injuring the fastening.

In testimony whereof I affix my signature.

LEWIS L. LIBBEY.